(12) United States Patent
Bossoutrot

(10) Patent No.: US 9,023,236 B2
(45) Date of Patent: May 5, 2015

(54) PROCESS FOR PREPARING CONCENTRATED ALKALI METAL HYPOCHLORITE SOLUTIONS

(75) Inventor: Jean-Michel Bossoutrot, Chaponost (FR)

(73) Assignee: Arkema France, Colombes (FR)

( * ) Notice: Subject to any disclaimer, the term of this patent is extended or adjusted under 35 U.S.C. 154(b) by 774 days.

(21) Appl. No.: 13/299,599

(22) Filed: Nov. 18, 2011

(65) Prior Publication Data
US 2012/0126169 A1     May 24, 2012

Related U.S. Application Data

(60) Provisional application No. 61/415,093, filed on Nov. 18, 2010.

(30) Foreign Application Priority Data

Nov. 18, 2010 (FR) ..................................... 10 59461

(51) Int. Cl.
*C11D 3/395*     (2006.01)
*C01B 11/06*     (2006.01)

(52) U.S. Cl.
CPC .................................. *C01B 11/062* (2013.01)

(58) Field of Classification Search
USPC .................................................... 252/187.25
See application file for complete search history.

(56) References Cited

U.S. PATENT DOCUMENTS

| | | | |
|---|---|---|---|
| 2005/0072687 A1* | 4/2005 | Hubbard | 205/516 |
| 2010/0044242 A1* | 2/2010 | Bhavaraju et al. | 205/556 |
| 2010/0084605 A1* | 4/2010 | Bakkenes et al. | 252/187.26 |

FOREIGN PATENT DOCUMENTS

EP    0527083    2/1993

* cited by examiner

*Primary Examiner* — John Hardee
(74) *Attorney, Agent, or Firm* — Smith, Gambrell & Russell, LLP

(57) ABSTRACT

The present invention relates to a process for preparing concentrated alkali metal hypochlorite solutions. One subject of the invention is more particularly a process for preparing concentrated bleach which may have a chlorine content of greater than 100 chlorometric degrees, and that has a low content of chlorates.

19 Claims, 1 Drawing Sheet

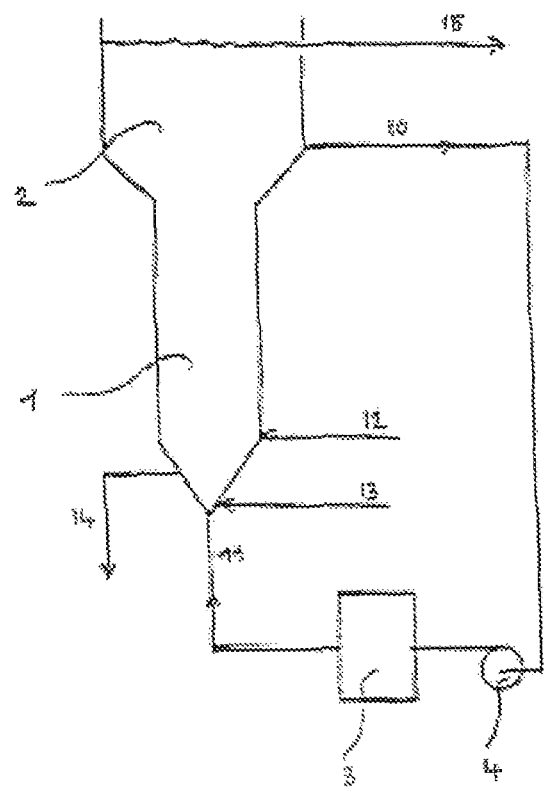

PROCESS FOR PREPARING CONCENTRATED ALKALI METAL HYPOCHLORITE SOLUTIONS

This application claims priority to U.S. provisional application Ser. No. 61/415,093 filed Nov. 18, 2010 and French application serial number 10.59461 filed Nov. 18, 2010.

FIELD OF THE INVENTION

The present invention relates to a process for preparing concentrated alkali metal hypochlorite solutions. One subject of the invention is more particularly a process for preparing concentrated bleach which may have a chlorine content of greater than 100 chlorometric degrees, and that has a low content of chlorates.

BACKGROUND OF THE INVENTION

A process for synthesizing concentrated bleach is described in patent application EP 0 527 083. The synthesis is carried out by reacting one molecule of chlorine with sodium hydroxide. Due to its concentration, this "high titer" bleach is particularly economically advantageous since it makes it possible to limit transport costs. Indeed, since the amount of water in a high-titer bleach is lower than in a standard bleach, less water is transported for the same amount of bleach. Moreover, the high-titer bleach obtained by the above process contains little salt after dilution, which provides great stability over time.

Nevertheless, the synthesis of high-concentration bleach results in parasitic reactions being favored, such as the reaction resulting in the formation of chlorate according to the following reaction:

3NaClO→☐NaClO$_3$+2NaCl

This reaction generally results in the formation of chlorate during the synthesis, in a greater amount in high-titer bleach compared to bleaches obtained by other processes.

However, the presence of chlorate in the bleach constitutes a major drawback when this bleach has, for example, to be added to drinking water. Indeed, when bleach is added to drinking water, the regulations usually require a very low content of chlorate.

BRIEF DESCRIPTION OF THE DRAWINGS

FIG. 1 is a schematic of an embodiment of the present invention.

DETAILED DESCRIPTION OF THE INVENTION

A process has now been found for preparing concentrated alkali metal hypochlorite solutions that have a low content of chlorates.

The invention is a process for preparing a concentrated solution of an alkali metal hypochlorite by reacting chlorine and a solution of the corresponding alkali metal hydroxide in the presence of alkali metal chloride crystals in which, in an essentially vertical vessel of volume "Vr", the bottom part of which has a cross section smaller than the cross section of its top part:

a) chlorine and an alkali metal hydroxide solution are injected into the bottom part, b) in the top part, the hypochlorite solution is withdrawn at a flow rate "Qs", (i) one portion forms the concentrated hypochlorite solution produced, (ii) the other portion is recycled to the bottom part of the vessel, c) the alkali metal chloride crystals are purged close to the lower end of the bottom part of the vessel, d) the recycling and the injection of the reactants from step a) are adjusted so that the alkali metal chloride crystals are fluidized essentially in the bottom part of the vessel, and characterized in that the chlorates are present in an amount between 0.01% by weight and 0.2% by weight by carrying out the process under the conditions below:

$$0.01\% < r*X*(100*M/\rho) < 0.2\%$$

where
r is the rate of reaction expressed in mol/l·s, where r=k [ClO$^-$]$^2$;

$$k = k_0 * e^{\frac{-Ea}{RT}},$$

$K_0$=7.91×10 l/mol·s; Ea=1.05×10$^5$ J/mol, R=8.314472 J/mol.K, and T is the temperature of the reactor expressed in Kelvin;

X is the residence time expressed in seconds, where X=Vr/Qs;

M is the molar mass of sodium chlorate, i.e. 106.5 g/mol;

$\rho$ is the density of the solution expressed in g/l.

Thus, in the process that is the subject of the invention, the concentration of chlorates is between 0.01% and 0.2% by weight relative to the total weight of bleach.

The concentration of hypochlorite ions [ClO$^-$] is measured by oxidation of potassium iodide in an acetic medium and titration of the iodine formed with sodium thiosulfate.

The process that is the subject of the invention may be carried out with pure, liquid or gaseous chlorine or a gas containing chlorine and that is inert with respect to the reaction; for example, air or nitrogen laden with chlorine. The concentration of the hydroxide solution is chosen as a function of the concentration of the hypochlorite solution that it is desired to prepare. It is also possible to use a concentrated hydroxide solution and to add water. The reaction is complete and stoichiometric. It can be carried out at any pressure, but it is much simpler to operate at atmospheric pressure. The container may be opened, but it is preferred to seal it and to connect it to an absorption system in order to ensure that, in the event of an incident, no chlorine is allowed to escape into the atmosphere, although a slight excess of hydroxide is always used. The temperature of the solution inside the vessel and in the recycling circuit is preferably kept below 35° C. to prevent the formation of chlorate.

It is possible to place a heat exchanger preferably in the recycling circuit or to place an exchanger in the vessel, or to use a jacketed vessel with circulation of a fluid at low temperature, or any combination of these means.

The vessel may be a simple column surmounted by another column of larger diameter, the connection being made by a conical frustum. The ratio of the cross section of the top part to the cross section of the bottom part should be sufficient so that the fluidized crystals remain in the majority in the bottom part and so that, if the fluidization is too strong, they can settle in the top part and redescend into the bottom part. Thus, growth of the alkali metal chloride crystals is obtained, the precipitation of the chloride taking place on the existing crystals. New small crystals are obviously also formed, which are in the entire vessel and which circulate with the recycle. Advantageously, the ratio of the cross section of the top part of the vessel to the cross section of the bottom part is greater than 1.2 and preferably between 2 and 12. The volume of the bottom part may represent at least 30% of the total volume of the vessel and preferably 40 to 60%. The volume of the bottom part is determined, as in the prior art, by the reaction of chlorine with the alkali metal hydroxide.

The portion of the hypochlorite withdrawn in step b) and which constitutes the output may then be filtered or diluted slightly in order to make the small alkali metal chloride crystals disappear.

The process that is the subject of the invention thus has two major advantages:

(i) it makes it possible to produce a hypochlorite solution with a low concentration of chlorates, which are undesirable compounds when the solution must, for example, be added to drinking water; and (ii) it makes it possible to easily produce a very concentrated hypochlorite solution that can therefore be diluted slightly in order to rid it completely of the smallest chloride crystals.

Thus, according to the invention a concentrated hypochlorite solution is produced that is practically free of chloride crystals and free of chlorates. A slight dilution then makes the last NaCl crystals disappear, but above all makes it possible to have a concentrated solution which is not saturated with alkali metal chloride. This solubility margin limits the reappearance of salt crystals before the use of the product. It is thus possible to produce a hypochlorite containing 27% of active chlorine that is diluted to 25% of active chlorine. The conversion from chlorometric degrees to % active $Cl_2$ is given by the following formula:

% active $Cl_2$=(chlorometric degree×3.17 g/l×100)/ (density (g/l))

Thus, for example:

| Chlorometric degree | Density | % active chlorine |
|---|---|---|
| 115 | 1335 | 27.3 |
| 100 | 1315 | 24.1 |

Another advantage of this process from an industrial viewpoint is that it does not require the introduction of alkali metal chloride crystals in order to initiate the crystallization in the start-up phases. The fine particles trapped in the reactor gradually grow and form the fluid bed.

According to one preferred embodiment of the invention, step b) is carried out by drawing off the concentrated hypochlorite solution produced at the upper end of the top part and the hypochlorite solution for recycling ds withdrawn at a point located in the top part but below the draw-off point. It is also possible to adjust the recycling and the injection of the reactants so that the small chloride crystals normally present iii the top part rise to the point where the recycle is withdrawn but do not rise up to the upper end of the top part. A person skilled in the art may easily determine this height that separates the upper end of the top part and the withdrawal point of the recycle. Preferably, the withdrawal for recycling takes place at the mid-height of the top section.

FIG. 1 describes one possible embodiment of the present invention. 1 and 2 represent, respectively, the bottom part and the top part of the vessel. The concentrated hypochlorite produced is drawn off at 15 and withdrawn at 10 is the hypochlorite solution for recycling to the pump 4 and which returns at 11 into the bottom part 1 after passing through the exchanger 3. The alkali metal hydroxide solution is injected via the pipe 13 and the chlorine via the pipe 12. The alkali metal chloride is extracted via the pipe 14.

Example 1 Comparative

A device according to FIG. 1, having the following characteristics, is used:

The reactor used is made up of three parts:
* A conical lower part ($\phi$1300, h=1900) receives the return of the cooling loop.
* A cylindrical intermediate part ($\phi$1300, h=3500) constitutes the reaction and fluidization zone.
* A cylindroconical upper part ($\phi$3500, h=1900) referred to as the settling zone.

The reactants are injected at the bottom of the intermediate part. The starting point of the cooling loop is at the bottom of the cylindrical part whereas the outlet of the finished product is in the upper part. The volume of the vessel is 15 m³. The bottom part represents 37% of the volume of the vessel. The ratio of the cross sections is 7. The recycle flow rate is 60 m³ per hour. A heat exchanger cools from 30° C. to 20° C.

1270 kg/h of NaOH (50% sodium hydroxide), 1100 kg/h of 97% chlorine, and 1200 kg/h of water are injected upstream of the recirculating pump. 3 m³/h of sodium hypochlorite solution containing 27% of active $Cl_2$ and 600 kg/h of NaCl crystals are produced. After drawing off, the bleach is diluted from 27 to 25% active chlorine.

The average daily loss over 7 days is of the order of 0.35% of active chlorine at 17° C.

The chlorate content before dilution is 0.26% by weight relative to the total weight of the bleach solution.

Example 2 Invention

Example 1 is reproduced, changing the following parameters:
T=30° C.
residence time: 3 h
chlorate concentration obtained: 0.16% by weight relative to the total weight of the bleach solution Example 3 Invention Example 1 is reproduced, changing the following parameters:
T=25° C.
residence time: 5 h
chlorate concentration obtained: 0.13% relative to the total weight of the bleach solution Example 4 Invention Example 1 is reproduced, changing the following parameters:
T=20° C.
residence time: 3 h
chlorate concentration obtained: 0.04% relative to the total weight of the bleach solution

The invention claimed is:
1. Process for preparing a concentrated solution of an alkali metal hypochlorite by reacting chlorine and a solution of the corresponding alkali metal hydroxide, in the presence of alkali metal chloride crystals in which, in an essentially vertical vessel of volume "Vr", the bottom part of which has a cross section smaller than the cross section of its top part:
   a) chlorine and an alkali metal hydroxide solution are injected into the bottom part, b) in the top part, the hypochlorite solution is withdrawn at a flow rate "Qs", (i) one portion forms the concentrated hypochlorite solution produced, (ii) the other portion is recycled to the bottom part of the vessel, c) the alkali metal chloride crystals are purged close to the lower end of the bottom part of the vessel, d) the recycling and the injection of the reactants from step a) are adjusted so that the alkali metal chloride crystals are fluidized essentially in the bottom part of the vessel, and wherein the chlorates are present in an amount between 0.01% by weight and 0.2% by weight by carrying out the process under the conditions below:

$$0.01\% < r*X*(100*M/\rho) < 0.2\%$$

where r is the rate of reaction expressed in mol/l·s, where $r=k [ClO^-]^2$;

$$k = k_0 * e^{\frac{-Ea}{RT}},$$

$K_0=7.91\times10^{10}$ l/mol·s; $Ea=1.05\times10^5$ J/mol, $R=8.314472$ J/mol.K, and T is the temperature of the reactor expressed in Kelvin;

X is the residence time expressed in seconds, where $X=Vr/Qs$;

M is the molar mass of sodium chlorate, i.e. 106.5 g/mol;

$\rho$ is the density of the solution expressed in g/l.

2. Process according to claim 1, wherein the ratio of the cross section of the top part of the vessel to the cross section of the bottom part is greater than 1.2.

3. The process of claim 2, wherein the volume of the bottom part represents at least 30% of the total volume of the vessel.

4. The process of claim 2, wherein the volume of the bottom part represents 40 to 60% of the total volume of the vessel.

5. The process of claim 2, wherein step b) is carried out by drawing off the concentrated hypochlorite solution produced at the upper end of the top part and the hypochlorite solution for recycling is withdrawn at a point located in the top part but below the draw-off point.

6. The process of claim 5, wherein the withdrawal for recycling takes place at the mid-height of the top section.

7. Process according to claim 1, wherein the volume of the bottom part represents at least 30% of the total volume of the vessel.

8. The process of claim 7, wherein step b) is carried out by drawing off the concentrated hypochlorite solution produced at the upper end of the top part and the hypochlorite solution for recycling is withdrawn at a point located in the top part but below the draw-off point.

9. The process of claim 8, wherein the withdrawal for recycling takes place at the mid-height of the top section.

10. Process according to claim 1, wherein step b) is carried out by drawing off the concentrated hypochlorite solution produced at the upper end of the top part and the hypochlorite solution for recycling is withdrawn at a point located in the top part but below the draw-off point.

11. Process according to claim 10, wherein the withdrawal for recycling takes place at the mid-height of the top section.

12. The process of claim 1, wherein the ratio of the cross section of the top part of the vessel to the cross section of the bottom part is between 2 and 12.

13. The process of claim 12, wherein the volume of the bottom part represents at least 30% of the total volume of the vessel.

14. The process of claim 12, wherein the volume of the bottom part represents 40 to 60% of the total volume of the vessel.

15. The process of claim 12, wherein step b) is carried out by drawing off the concentrated hypochlorite solution produced at the upper end of the top part and the hypochlorite solution for recycling is withdrawn at a point located in the top part but below the draw-off point.

16. The process of claim 15, wherein the withdrawal for recycling takes place at the mid-height of the top section.

17. The process of claim 1, wherein the volume of the bottom part represents 40 to 60% of the total volume of the vessel.

18. The process of claim 17, wherein step b) is carried out by drawing off the concentrated hypochlorite solution produced at the upper end of the top part and the hypochlorite solution for recycling is withdrawn at a point located in the top part but below the draw-off point.

19. The process of claim 18, wherein the withdrawal for recycling takes place at the mid-height of the top section.

\* \* \* \* \*